United States Patent [19]

Redlich

[11] Patent Number: 4,484,320
[45] Date of Patent: Nov. 20, 1984

[54] APPARATUS AND METHOD FOR CUTTING INFORMATION INTO A METALLIC RECORD CARRIER

[75] Inventor: Horst Redlich, Berlin, Fed. Rep. of Germany

[73] Assignee: TELDEC Telefunken-Decca-Schallplatten GmbH, Hamburg, Fed. Rep. of Germany

[21] Appl. No.: 366,394

[22] Filed: Apr. 7, 1982

[30] Foreign Application Priority Data

Apr. 8, 1981 [DE] Fed. Rep. of Germany ....... 3114108

[51] Int. Cl.$^3$ .............................................. G11B 3/00
[52] U.S. Cl. .................................... 369/132; 369/153
[58] Field of Search ............... 369/132, 133, 135, 138, 369/139, 153; 358/343, 342

[56] References Cited

U.S. PATENT DOCUMENTS 3,490,771  1/1970  Bauer .................................. 369/133
4,044,379  8/1977  Halter .
4,060,831  11/1977  Halter .................................. 369/133
4,248,438  2/1981  Knothe et al. .

FOREIGN PATENT DOCUMENTS 2216051  11/1973  Fed. Rep. of Germany .

Primary Examiner—Donald E. McElheny, Jr.
Attorney, Agent, or Firm—Spencer & Frank

[57]  ABSTRACT

Apparatus for recording an information signal on a metallic record carrier. The information is impressed on the carrier by cutting a groove therein by means of a stylus, the groove being characterized at each point by a slope or modulation pitch angle. The stylus has a longitudinal axis, a leading edge substantially parallel to this axis and a trailing edge. The angle between the longitudinal axis of the stylus and a normal to the surface of the record carrier is greater than 10° and not more than a value which would make the angle between the trailing edge of the stylus and the surface of the record carrier less than the maximum modulation pitch angle. The stylus is movably attached to a fixed structure by a mounting member and is electromagnetically excited by a driving member to shape the grooves in the record carrier in accordance with the information signal. The record carrier, stylus, mounting and driving members are dimensioned to generate an oscillation at a frequency which is higher than that of the information signal and superimpose this oscillation on the information signal.

10 Claims, 5 Drawing Figures

APPARATUS AND METHOD FOR CUTTING INFORMATION INTO A METALLIC RECORD CARRIER

BACKGROUND OF THE INVENTION

The present invention relates to an apparatus and method for cutting an information signal into a metal record carrier. More specifically, it relates to apparatus wherein the angular position of the stylus relative to a surface of the record carrier, and the characteristics of the stylus, associated components and the record carrier are selected and matched to superimpose an oscillation on the information signal which is higher than any frequency in the information signal.

It is known to produce sound or video recordings by cutting information into an original or master record carrier and then to make copies of the master by electrochemical means. Copies having essentially the same quality as the original can be obtained by making copies of the original and then duplicating these copies. However, the cutting of the information signal into the original record carrier must be performed with the utmost precision.

It is customary to cut the information signal into a so-called lacquer foil. Further, U.S. Pat. No. 4,044,379 discloses the use of a metallic record carrier, particularly of copper instead of a lacquer foil, for video recording. An advantage of a copper carrier is that it is substantially harder than a lacquer foil and the resulting quality is better than that obtained from conventional lacquer recordings. U.S. Pat. No. 4,248,488 to Knothe et al also discloses the use of copper as a record carrier wherein the copper has a Vickers hardness of between 110 and 300 kg/mm² and the cutting stylus is guided over the metal matrix at a contact angle of between 10° and 20°. The use of these teachings result in video recordings of good quality.

It is not possible to simply transfer this technique to audio record carriers. The known methods are not suitable for audio carriers, which have a much greater groove depth than video recordings, because the resistance exerted against the cutting stylus is substantially greater for audio recordings than for video recordings. Using known techniques, an acceptable surface on the sound groove walls cannot be obtained.

Accordingly, it is an object of the present invention to provide high quality sound recordings made on metallic record carriers as compared to the quality of audio recordings made on lacquer foils.

SUMMARY OF THE INVENTION

In accordance with the present invention, apparatus is provided for recording an information signal on a metallic record carrier. The information is impressed on the carrier by cutting a groove therein by means of a stylus, the groove being characterized at each point by a slope or modulation pitch angle.

The stylus has a longitudinal axis, a leading edge substantially parallel to this axis and a trailing edge. The angle between the longitudinal axis of the stylus, called the contact angle, and a normal to the surface of the record carrier is greater than 10° and not more than a value which would make the angle between the trailing edge of the stylus and the surface of the record carrier, called the lip angle, less than the maximum modulation pitch angle. The stylus is movably attached to a fixed structure by a mounting member, and is electromagnetically excited by a driving member to shape the grooves in the record carrier in accordance with the information signal. The record carrier, stylus and, mounting members are dimensioned to generate an oscillation at a frequency which is higher than that of the information signal and this oscillation is superimposed on the information signal.

The present invention provides an improvement in the signal-to-noise ratio of more than 10 dB compared to a conventional recording on a lacquer foil. This advantage is obtained because the generation of ultrasonic oscillations of the cutting stylus reduces the cutting resistance to such an extent that a high quality recording results, independent excitation by the untrasonic frequency signal automatically producing an ultrasonic signal having the desired amplitude. In particular, a shallow cutting depth produces a low amplitude ultrasonic signal and a deep cutting depth produces a high amplitude ultrasonic signal. With cutting depths less than 10 microns no ultrasonic signal can be detected.

German Offenlegungsschrift No. 2,216,051 discloses a method wherein both an information signal and a signal having a frequency which lies above the highest frequency in the information signal frequency range is applied to the electromechanical transducer of a recording head thereby increasing the fidelity and surface quality of the recording and providing an increase in recording density. However, this prior art method is relatively expensive compared to conventional cutting techniques and does not solve the problem on which the present invention is based. More specifically, this prior art gives no information on dependence of desired ultrasonic signal amplitude upon groove depth, which is caused by selfgenerating according to the present invention. Furthermore, this prior art does not relate to metallic carrier especially not to a copper carrier.

German Offenlegungsschrift No. 2,629,492 is also of interest in that it discloses a method and apparatus for electromechanically recording a short wavelength modulation signal in a metal matrix. However, in contrast to the present invention, this prior art system attempts to eliminate by the use of damping materials all resonances which during cutting tend to generate signals having frequencies that do not coincide with the signal frequencies thereby preventing the generation of ultrasonic vibrations. In this prior art there is no information on controling the amplitude of the ultrasonic frequency as well.

DESCRIPTION OF THE PREFERRED EMBODIMENT

Figure 1:
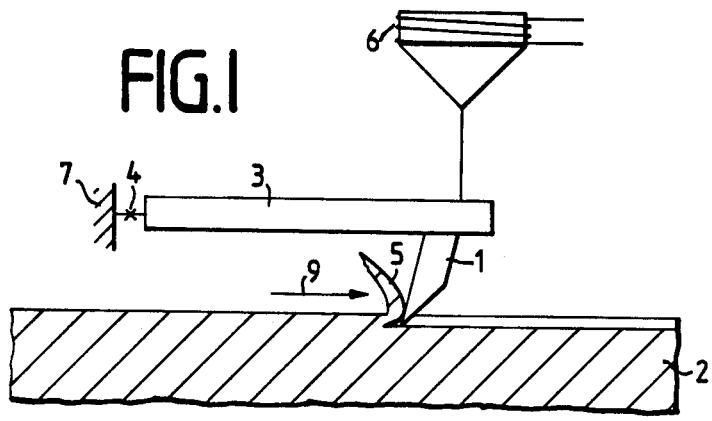
FIG. 1 is a schematic view of the invention showing the stylus cutting a groove in a record carrier.

Referring to FIG. 1, there is shown schematically an apparatus for recording an information signal on a metallic record carrier 2. The apparatus comprises a cutting stylus 1, preferably made of diamond, fastened to a fixed structure 7 by means of a mounting member 3. The mounting member 3 has a high elasticity modul (on the order of 7.000 kp/mm$^2$) and is fixed mounted in a suspension 4 attached to the fixed structure 7. A drive coil 6 is provided for electrodynamically driving the stylus 5 in accordance with the information signal.

The groove cut by the stylus 1 in the record carrier 2 as the carrier moves in the direction of arrow 9 has a depth which is modulated in accordance with the information signal applied to the drive coil 6. During the cutting operation, a chip 5 is produced which, for avoiding interference with the cutting process, should nevertheless be removed as cutting of the groove progresses. This may be accomplished by placing a suction tube (not shown) adjacent the stylus and sucking the chip into the tube.

Figure 2:
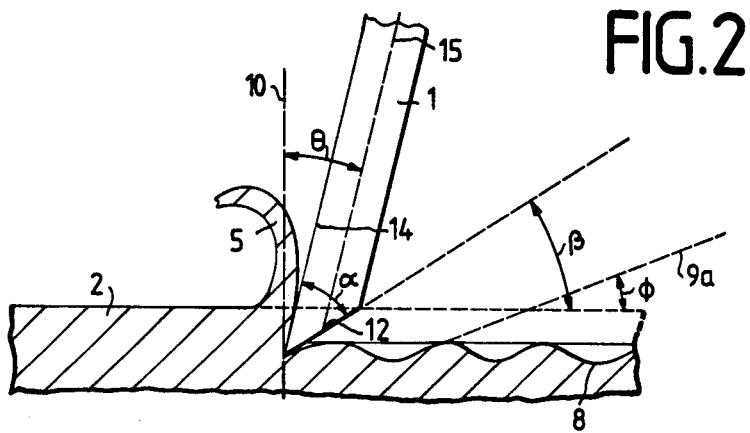
FIG. 2 is an enlarged view of the stylus during the cutting process.

FIG. 2 is an enlarged view of the stylus 1 and record carrier 2 showing the stylus lifting the chip 5 off the carrier. A longitudinal section of a portion of the groove cut by the stylus 1 is shown at 8, the variations in depth of the groove corresponding to the modulation applied to the stylus by the signal impressed on the drive coil 6. The groove modulation has a maximum pitch angle $\phi$ which varies with the amplitude of the modulation and wave length and therefore the depth of the groove, the pitch angle $\phi$ being defined as the angle between a tangent 9a to the groove in the region of greatest slope, as shown in FIG. 2. For audio frequencies, the maximum pitch angle which occurs in practice is about 25°.

The stylus has a longitudinal axis 15 which is positioned at a contact angle $\theta$ with respect to a line 10 perpendicular to the surface of the record carrier 2. The stylus has a trailing edge 12 and a leading edge 14, the leading edge 14 being essentially parallel to the longitudinal axis 15 and the trailing edge 12 making an angle $\alpha$, usually about 45°, with the leading edge 14. The stylus is positioned so that a lip angle $\beta$ between the trailing edge 12 and the surface of the record carrier 2 is maintained at an angle that is not less than the maximum modulation pitch angle $\phi$. For a lip angle $\beta$ equal to a pitch angle $\phi$ of about 25° and an angle $\alpha$ between the stylus trailing and leading edges of 45°, the contact angle $\theta$ is approximately 20°. The angle $\theta$ should be greater than 10° and, for optimum results, between 10° and 15°.

Figure 3:
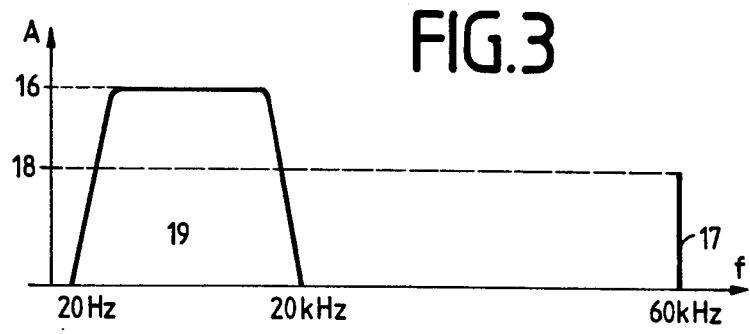
FIG. 3 is a diagram showing the frequency spectrum of the signal generated at the cutting stylus.

FIG. 3 is a diagram showing the amplitude of the audio and ultrasonic signals impressed on the record carrier 2 as a function of frequency. The information signal cut into the record carrier has a frequency spectrum 19 extending from about 20 Hz to about 20 kHz with a relative amplitude designated by 16. If an ultrasonic signal 17 having a frequency greater than 40 kHz, e.g. about 60 kHz, is superimposed on the information signal to be recorded, a recording having almost no interference results despite noise components that may be present in the spectrum 19. The amplitude of the ultrasonic signal 17 is a function of the useful information signal to be recorded and is at the most 1$\mu$.

The ultrasonic frequency is at least twice as high as the highest frequency which occurs in the information signal. It has a frequency of about 60-70 kHz. Due to the low amplitude of the ultrasonic frequency below 1$\mu$ in relation to the high maximum amplitude of about 50$\mu$ there is no interference to the information signal.

When a deep groove, e.g. with a high vertical recording amplitude, is cut then a high cutting resistance will occur and therefore a higher amplitude of the ultrasonic frequency is necessary for reducing cutting resistance. The present invention produces such control automatically.

When a relatively large contact angle $\theta$ is used, and when the parameters of the system are selected as discussed hereinafter, the ultrasonic signal 17 is generated by the cutting system itself, although the ultrasonic signal could be wholly or partially generated by an external source. Under these conditions, the amplitude 18 of the ultrasonic signal 17 depends upon the groove depth of the information signal 19. If the groove depth is relatively low (below 10$\mu$), no noticeable ultrasonic signal will be generated, the amplitude 18 of the ultrasonic signal 17 increasing with increases in the depth of the groove of the useful signal. The frequency of the ultrasonic oscillation is determined essentially by the mass and spring characteristics of the cutting stylus 1, the stylus mount 3 and the material of which the record carrier 2 is formed.

It has been determined by tests that the generation of an ultrasonic signal is advantageous only when the record carrier 2 is made of metal. A copper layer formed on the surface of the record carrier for cutting by the stylus is produced by an electrochemical process during which copper is precipitated with a predetermined Vickers hardness. Independent excitation of an ultrasonic frequency is obtained if the cuttable layer has a Vickers hardness higher than 160 kg/mm$^2$ with best results being achieved when the layer of the record carrier which is cut to form the groove includes copper having a Vickers hardness of about 180-200 kg/mm$^2$. Particularly good results are obtained when the cuttable layer, within the Vickers hardness range of 160-220 kg/mm$^2$, is cut just after precipitation, when the layer is still recrystallizable.

When the ultrasonic signal is self-excited, the material removal process is facilitated because of a reduction in the resistance to cutting. Since the ultrasonic frequency generated lies above the highest frequency to be recorded, preferably at least twice as high as that frequency, no interfering signal is generated during playback of the record.

Figure 4:
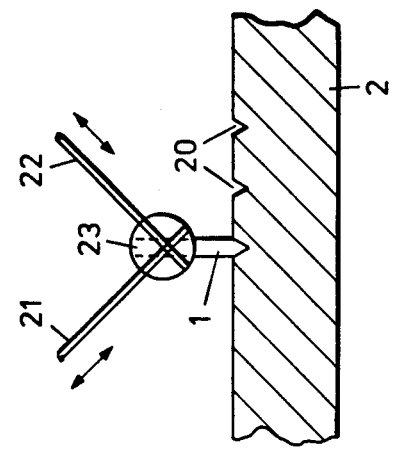
FIG. 4 is a front view of a cutting stylus.

FIG. 4 shows a cutting stylus 1 for cutting a spiral track 20 carrying stereo information into the record carrier 2. In order to record stereo signals, two driving arms 21 and 22 are provided which are disposed at an angle of 90° with respect to each other. Arms 21 and 22 are coupled to an aluminum mount 23 which supports the cutting stylus. The cutting stylus is preferably made of diamond.

Figure 5:
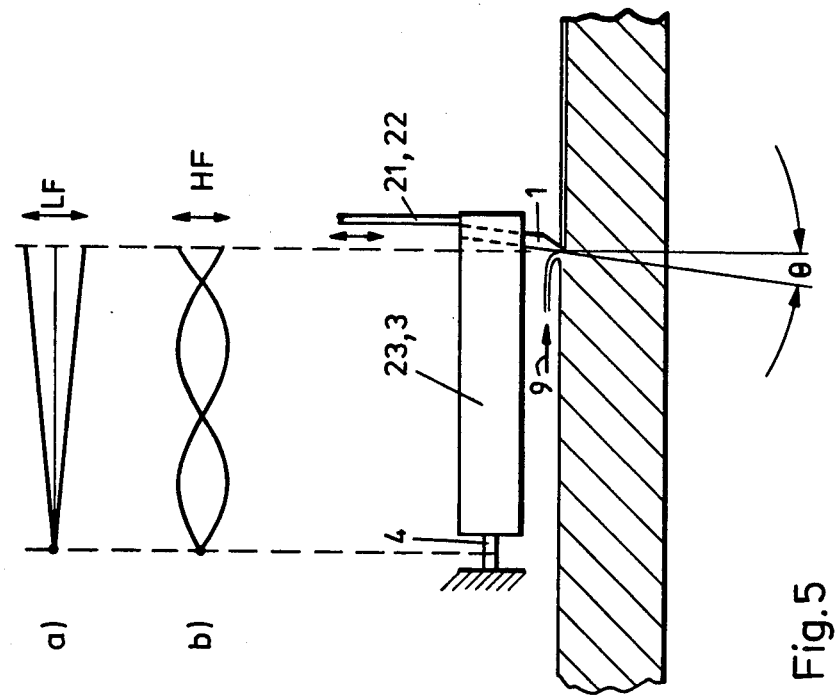
FIG. 5 is a side view of the cutting stylus of FIG. 4 showing the distribution of the low and ultrasonic oscillatory modes along the stylus.

FIG. 5 is a side view of the arrangement illustrated in FIG. 4. As shown, the aluminum mount 23 serving as the mount for the stylus is suspended in a suspension 4, the attenuation of the stylus and associated elements being made as low as possible. The cutting stylus 1 is inclined with respect to a normal to the record carrier at an angle $\theta$. A low frequency signal LF, corresponding to the information signal having the frequency spectrum 19 (FIG. 3) is supplied to the cutting stylus 1 by means of the driving arms 21,22 causing a deflection along the metal mount 23, as shown at (a) in FIG. 5. The generated ultrasonic oscillation HF, shown at (b) in FIG. 5, produces along the aluminum mount 23 one or more oscillation loops corresponding to a partial resonance of the cutting device. Superposition of the ultrasonic oscillation HF on the low frequency signal LF results in it being recorded on the record carrier. The resonance is produced because the cuttable record disc layer 2 exerts a force on the cutting stylus 2 causing it to vibrate together with the mount 23.

The used aluminium mount 23 has a length of about 12 mm with a diameter of about 2.5 mm, the diameter of the mount is reduced on the suspension end to a diameter of about 1 mm and is fixed suspended in the structure 7. The diamond has a length of 2–3 mm with a quadratic cross-section of about 0.6 mm. This dimensions cause on ultrasonic frequency as a partial resonance of the cutting device with a frequency of about 60–70 kHz.

The oscillation is produced by the cutting process itself. The used copper should have a Vickers hardness of at least 160 kp/mm². Then the attenuation of the copper is low enough to produce independantly said partial resonance in the cutting device. The same device used in conventional techniques with a lacquer foil instead of a copper layer would not produce any oscillations. This is due to the high attenuation of a lacquer foil.

It will be understood that the above description of the present invention is susceptible to various modifications, changes and adaptations, and the same are intended to be comprehended within the meaning and range of equivalents of the appended claims.

What is claimed is:

1. Apparatus for recording an information signal on a record carrier, said recorded information signal having a predetermined maximum modulation pitch angle, comprising
    a stylus for cutting a groove in a surface of said record carrier, said stylus having a longitudinal axis, a leading edge substantially parallel to said longitudinal axis and a trailing edge, said stylus being positioned so that the angle $\theta$ between the longitudinal axis thereof and a normal to the surface of said record carrier is greater than 10° and not more than a value which would make the angle $\beta$ between the trailing edge of said stylus and the surface of said record carrier less than said maximum modulation pitch angle;
    mounting means for movably attaching said stylus to a fixed structure; and
    driving means for electromagnetically exciting said stylus to shape the grooves in said record carrier in accordance with said information signal, said record carrier, stylus, and mounting means being dimensioned to generate an oscillation signal having a frequency which is higher than that of said information signal and superimposing it thereon.

2. Apparatus as defined in claim 1 wherein said angle $\theta$ between the longitudinal axis of said cutting stylus and the normal to the surface of said record carrier is in the approximate range of 10° to 15°.

3. Apparatus as defined in claim 1 wherein the frequency of said oscillation is at least twice the highest frequency in the information signal to be recorded.

4. Apparatus as defined in claim 1 wherein said stylus is made of diamond.

5. Apparatus as defined in claim 1 wherein said oscillation signal has an ultrasonic frequency greater than 40 kHz.

6. Apparatus as defined in claim 1 wherein said record carrier is made of copper having a Vickers hardness in the range 160 to 220 kg/mm².

7. Apparatus as defined in claim 6 wherein the record carrier material from which said groove is cut is still recrystallizable after the cutting process.

8. Apparatus as defined in claim 6 wherein said copper is electrochemically produced.

9. Apparatus as defined in claim 1 wherein the attenuation of said stylus, mounting and driving means is minimized.

10. The method of cutting with an electrodynamically driven stylus, a track corresponding to an information signal in a metallic record carrier comprising:
    generating a first signal having a frequency corresponding to that of said information signal;
    driving said stylus with said first signal to cut a groove in said record carrier corresponding to said information signal, said record carrier having a predetermined Vickers hardness during the cutting of said groove; and
    superimposing a second signal having a frequency which is higher than the highest frequency in said first signal on said first signal, the amplitude of said second signal depending on the cutting depth of said information signal.

* * * * *